United States Patent

[11] 3,623,644

[72] Inventor Alf J. Olsen
Elk Grove, Ill.
[21] Appl. No. 14,480
[22] Filed Feb. 26, 1970
[45] Patented Nov. 30, 1971
[73] Assignee Teletype Corporation
Skokie, Ill.

[54] WEB-HANDLING APPARATUS
20 Claims, 8 Drawing Figs.

[52] U.S. Cl. .......... 226/89, 242/75.3, 179/100.2 Z
[51] Int. Cl. .......... G03b 1/56
[50] Field of Search .......... 226/89–91; 242/189, 75.3; 179/100.2 Z; 352/158, 157

[56] References Cited
UNITED STATES PATENTS
3,405,857 10/1968 Albrecht .......... 242/75.3 X
2,935,271 5/1960 Vivie .......... 242/189

*Primary Examiner*—Allen N. Knowles
*Assistant Examiner*—Gene A. Church
*Attorneys*—J. L. Landis and R. P. Miller

ABSTRACT: A pair of guide members disposed on opposite sides of a transducer head hold a record tape in a tortuous course between a takeup reel and a supply reel. A pair of arms are rockably arranged for straightening the path by moving said guide members simultaneously and are controlled by springs and by a cam which is manually responsive. A link couples the cam and said arms and carries a follower which is engaged in a cam track in said cam.

A pinch roller is responsive to said cam through the agency of a linkage to said follower and moves between a tape disengaged position and a position in which the tape is held in capstan contact as the guide members move between straight and tortuous course conditions.

INVENTOR
ALF J. OLSEN

BY Sherman P. Appel
ATTORNEY

WEB-HANDLING APPARATUS

BACKGROUND OF THE INVENTION

The present invention relates to web management. Particularly it relates to threading a web such as magnetic record tape in utilizing apparatus.

In a conventional intelligence record/retrieve apparatus of the type in which a carrier for records comprises a tape with a magnetic track, a tortuous path or maze is provided for tape travel between a supply reel and a takeup reel to provide orderly management therebetween and to prevent undesirable tape accumulation or tensioning about a station defined by a transducer for transferring intelligence to or from the magnetic track.

Sophisticated development in this general art has been applied to problems relating to handling of webs such as photographic film in order to enable threading and rapid rewind in cameras and projectors. However, the solution of problems relating specifically to those devices offers insufficient assistance for specific problems which attend handling of magnetic record tape. These problems frequently arise from variation in designs of tape-handling devices and in some measure attention thereto has been minimal.

It is an object of the present invention to provide improved web handling.

It is a further object of the invention to enable rapid threading of a web in web-managing apparatus.

It is another object of the invention to selectively alter a web course in web-handling apparatus.

It is yet further an object of the invention to enable straightening of a tortuous web course in web-handling apparatus.

It is an additional object of the invention, in apparatus having a tortuous course for magnetic record tape, to straighten the course to enable tape threading.

SUMMARY OF THE INVENTION

To effect the foregoing and other objects of the invention which will become apparent from ensuing description, according to one aspect of the invention: In apparatus for managing a web supported for movement past an intelligence transfer station over a tortuous course defined by a pair of guide members, a pair of arms, which comprise means for straightening the course, are arranged for moving the guide members. Cam-operated means are adapted for moving the arms between a first position in which the guide members are arranged for providing a tortuous course for the web and a second position in which the course for the web is straightened.

According to another aspect of the invention, the objects thereof are achieved by provision of means for moving the web including a capstan and an opposable pinch roller. Means are also provided for rocking the pinch roller between a first position adjacent the capstan to move the web in said course when tortuous and a second position removed from said capstan when said course is straightened.

BRIEF DESCRIPTION OF THE DRAWINGS

In the ensuing Detailed Description of the invention, reference is had to the accompanying drawings in which.

DETAILED DESCRIPTION OF THE INVENTION

Figure 1:
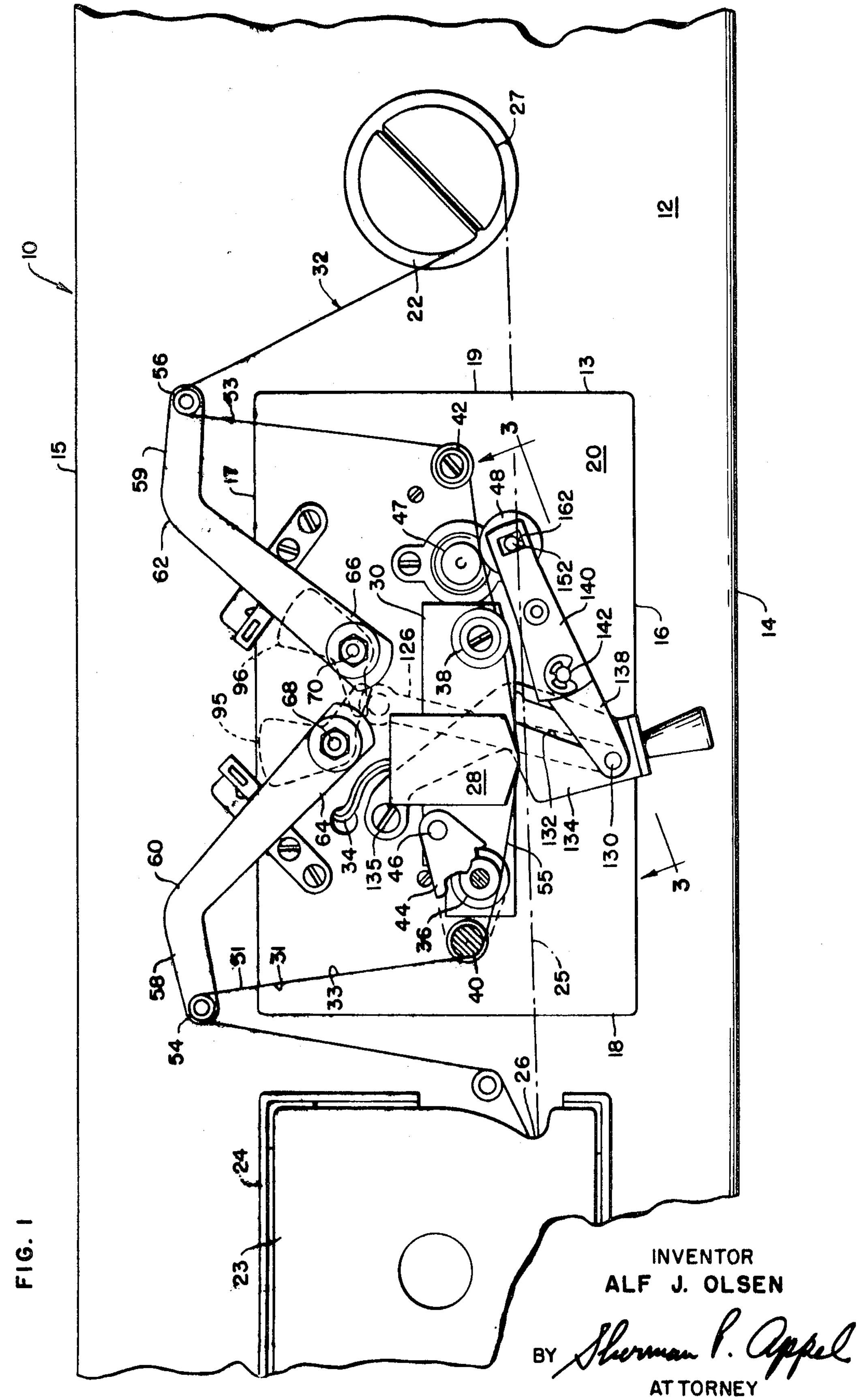
FIG. 1 is a top plan view of web-handling apparatus embodying the invention, showing a web held in a tortuous course, parts shown in dashed line for illustration and parts broken away in the interest of drawing economy.
Figure 2:
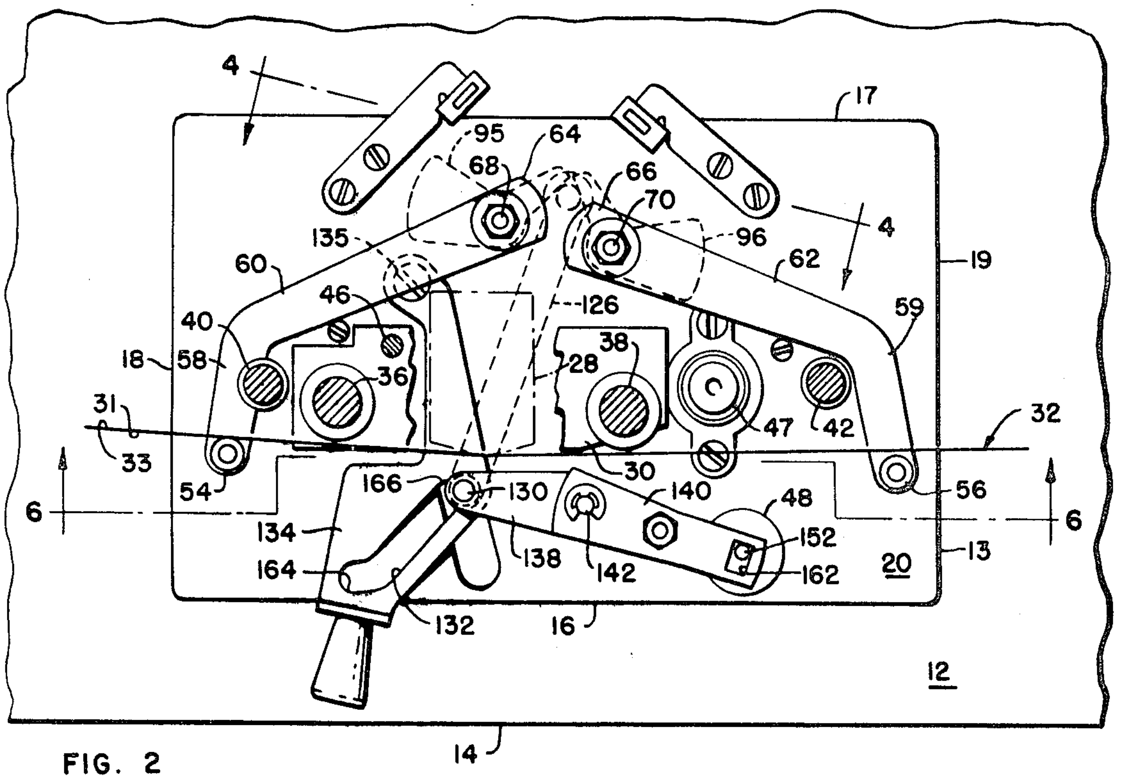
FIG. 2 is a view similar to FIG. 1, however, showing the web course straightened.

Referring now more particularly to FIGS. 1 and 2, a record/retrieve apparatus 10, only sufficient of which is shown to facilitate understanding of the invention, comprises a deck 12 of planar configuration. A substantially rectangular plate is inset in said deck and is adapted as a hanger or base 13 for components comprising the invention.

For purpose of orientation with respect to ensuing description, deck 12 is assumed to have a horizontal orientation with a front side 14 appearing lowermost and a rear side 15 appearing uppermost in FIG. 1. Accordingly, base 13 also has a horizontal orientation with a front side 16, a back side 17, and opposed lateral sides 18 and 19. It is also assumed for the purpose of facilitating description that the surface 20 of the deck which is seen by looking at FIGS. 1 and 2 is its top or uppermost; and surface 21 (FIGS. 7 and 8) of said deck is lowermost.

First and second driven spindles (not shown) drivably support respective of takeup means comprised of a hubbed web takeup member 22 and supply means comprised of a supply reel (not shown) in a tape supply cassette 23 on opposite sides of base 13. A well 24 which opens upwardly from surface 20 is adapted as a receptacle for said cassette. The arrangement is such that an imaginary straight line 25 from the delivery opening 26 of the cassette tangent the hub 27 of the takeup member clears all fixed structures in its path.

A transducer head 28 for an electromagnetic transducer assembly which defines an intelligence transfer station is supported from a platform 30 (FIGS. 1, 2 and 6) spaced from base 13 in a centralized position. It is arranged for maintaining tracking association with a web such as a conventional magnetic record tape 32 as it moves from its supply source to its takeup during intelligence recordal or retrieving procedures. A pair of conductive leads 34 which project from the head through base 13 connect the head in a circuit (not otherwise shown) for selectively conditioning the transducer assembly for intelligence recordal or retrieval in a manner which may be conventional.

A first pair of web guides 36 and 38 of generally cylindrical configuration are rigidly supported and project upwardly from platform 30 on opposite sides of transducer head 28. These web guides are most head proximate of the web guiding structures and are spaced slightly from said head though offset slightly rearwardly from imaginary line 25 which extends just in front of the head. A second pair of web guides 40 and 42 of cylindrical configuration are disposed laterally to the first pair of guides though slightly further rearwardly offset from imaginary line 25. Guide 42 projects upwardly from base 13 to which it is rigidly secured and like guides 36 and 38 it is not a roller. On the other hand, guide 40 is a roller which is spaced from base 13. It depends from a flat hanger 44 which is disposed parallel to said base and is secured to the top of guide 36 and a locating pin 46 which projects upwardly from platform 30. The disposition of guides 36, 38, 40 and 42 is such that during recording retrieval of intelligence, tape 32 will be engaged guidingly as it moves between cassette 23 and takeup member 22.

A capstan 47 is rotationally mounted from base 13 and comprises means for driving tape 32, said capstan being disposed in a fixed position adjacent the web path between guides 38 and 42. A pinch roller 48 is rockably mounted and controlled for releasably holding the tape, as it travels during recording and retrieval of intelligence against the capstan. A spindle 49 (FIGS. 6 and 7) from which the capstan is carried projects below the deck 12. It is reversibly driven by means which may be well known. Herein exemplary driving means comprise a pulley system of which there is shown a sheave 50 which is secured to said spindle and a pulley belt 52 (only a fragment of which is seen) entrained in driving association with the sheave. The disposition of guide members 36, 38, 40 and 42 as well as capstan 47 is such that they engage the rear or trackable surface 33 of tape 32.

A generally tortuous or first course condition (FIG. 1) along which tape 32 travels during intelligence recordal and retrieval is defined by a pair of rockable guide members 54 and 56. These are disposed laterally relative transducer head 28 and are rollers which engage opposed positions of the front surface 31 of the tape. In the illustrated embodiment guide members 54 and 56 are adapted, when in a first position, to hold opposed tape segments 51 and 53 (FIG. 1) at angles of approximately 105° with respect to a medial segment 55 which is entrained about the transducer head when said first course condition prevails.

Guide members 54 and 56 are adapted for movement between said first position (FIG. 1) and a second position (FIG. 2), the latter being normally assumed for the threading of the tape. When said guide members are disposed for tape threading, the tape path is in its second or straightened condition, guide members 54 and 56 then being disposed forwardly of imaginary line 25.

For moving the guide members 54 and 56, a pair of winglike arms 60 and 62 are provided. They are substantially of the same configuration but arranged in opposition and have opposed outer end portions 58 and 59, from which said guide members rotatably are carried. Arms 60 and 62 also have spaced apart inner end portions of 64 and 66 which are pivotally connected to base 13. The disposition of the arms in such that they are rockable parallel to deck 12, the pivoting axes being defined by a pair of pivot pins 68 and 70 which extend vertically through base 13.

Figure 5:
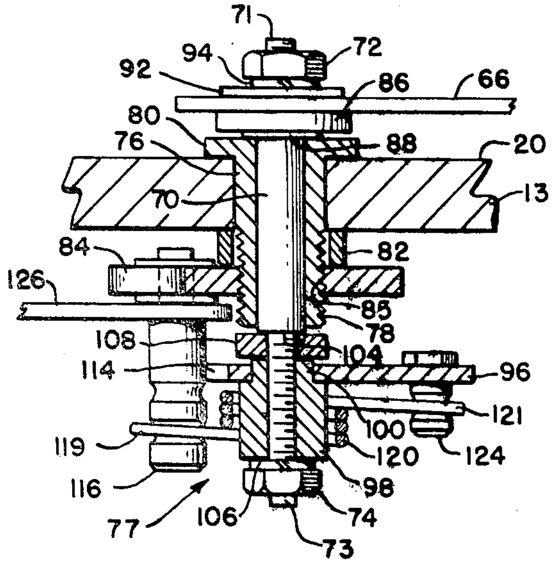
FIG. 5 is an enlarged detailed view according to the line 5—5 on FIG. 4.
Figure 4:
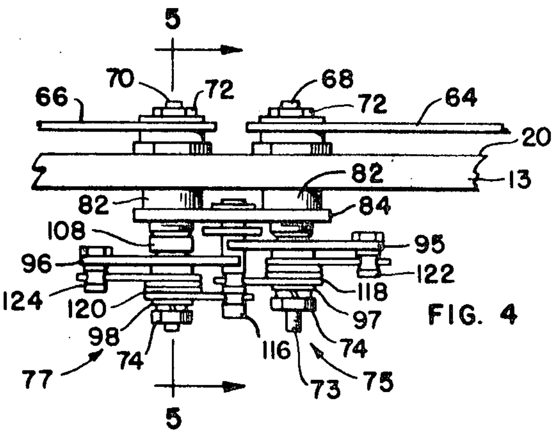
FIG. 4 is a sectional view according to the line 4—4 on FIG. 2.
Figure 6:
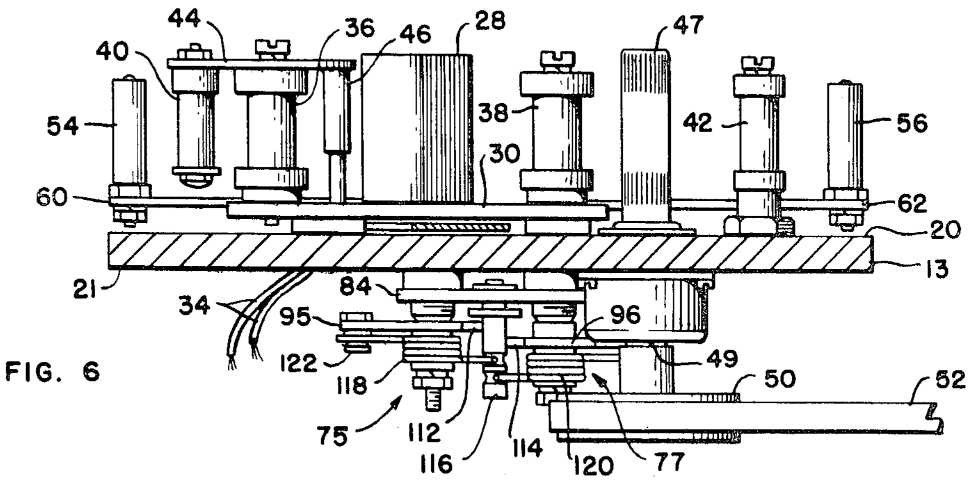
FIG. 6 is a view according to line 6—6 of FIG. 2, a portion of a deck and the web having been omitted.

Each of the pivot pins 68 and 70 has upper and lower threaded end portions 71 and 73 (FIG. 5) on which there are threadably mounted a pair of nuts 72 and 74 which serve as retainers for each of a pair of somewhat similar and opposed frictionally tied operating assemblies generally designated 75 and 77 (FIGS. 4, 5 and 6).

Each of assemblies 75 and 77 comprises a bushing 76 having a lower threaded end portion 78 which extends below base 13 and provides an internal journaling surface for a respective one of pins 68 and 70. Each bushing is hung from the top surface 20 of deck 13 by an integrally fashioned nut 80. A spacer 82 is disposed about each bushing 76 below surface 21 of base 13 from which it separates bracket 84. The latter member is associated with both of said assemblies and has a pair of internally threaded apertures 85 (only one being shown in FIG. 5) in each of which a corresponding end portion 78 threadly engages.

Above base 13, each of the pivot pins 68 and 70 has an integral radical flange 86 which seats against a raised bearing annulus 88 fashioned integrally from the top of an associated nut 80. The upper threaded end portion 71 of such pivot pin projects through an associated one of arms 60 and 62, each arm being frictionally tied to its flange 86 and accordingly its pivot pin by the corresponding nut 72 through the agency of a washer 92 and split spring ring 94 mounted about end portion 71 in a conventional fashion.

Below base 13, pivot pin 70 is rigidly secured to a bracket 96 by a sleeve 98. The latter is disposed about end portion 73 of pin 70 and itself has a reduced end portion 100 which is press fit into a receiving aperture in said last bracket. Associated nut 74 generates a frictional tying force between its sleeve 98 and a radial annulus 104 which is fashioned integrally with its pivot pin, a split ring spring 106 maintaining a frictional bias or tension in a usual manner to tie said sleeve and pivot pin.

Assembly 77, though essentially of the same construction as assembly 75, differs from assembly 75 in that the former has a spacer 108 which is omitted from the latter. Said spacer is disposed about pivot pin 70 between sleeve 98 and annulus 104 which are frictionally tied together. In consequence, the levels of bracket 95 (FIG. 4) and sleeve 97 in assembly 75 are higher than corresponding bracket 96 and sleeve 98 of assembly 77.

Brackets 96 and 97, respectively, have integral centrally disposed horizontal projections 112 and 114 whose inner ends are spaced vertically in overlapping relationship. They are held in engagement with the back side of a vertical pin or boss 116 by oppositely coiled compression or torsion springs 118 and 120 which are disposed at different vertical levels and each of which is arranged for angular movement about a corresponding of sleeves 97 and 98. To that end spring 118 has a pair of opposed inner and outer extension 115 and 117 (FIGS. 7 and 8); and spring 120 has a pair of corresponding extensions 119 and 121. Each outer extension tensionedly engages the front side of a corresponding of lugs or abutments 122 and 124 which depends from an associated of brackets 95 and 96; while each inner extension tensionedly engages the front side of boss 116, extension 115 being superposed with respect to extension 119. Moreover, the lengths of said inner extensions are such that while guide members 54 and 56 are in their second position (FIGS. 2, 4 and 8) they will be disposed in overlapping association.

Boss 116 is included in means for moving arms 60 and 62 and accordingly guide members 54 and 56 between their first and second positions. Also included in said last mentioned means is a link 126 mounted for shifting in a horizontal plane. It is fashioned as a straight arm and disposed below base 13, and from a rear end portion carries said boss. Said boss has a vertical aspect and engages in a guide slot 128 (FIGS. 7 and 8) formed in a medial part of bracket 84.

A follower 130 (FIGS. 1, 2 and 7) having a vertical orientation is carried from the forward end portion of link 126. It projects through base 13 and is engaged in a camming slot 132 of a manually controllable flat cam 134. The latter is rockably disposed about a pin 135 beneath platform 30 along the upper surface 20 of base 13 between a first angular aspect (FIG. 1) in which the first condition of the tape course prevails and a second angular aspect (FIG. 2) in which the second tape course condition prevails.

Figure 3:
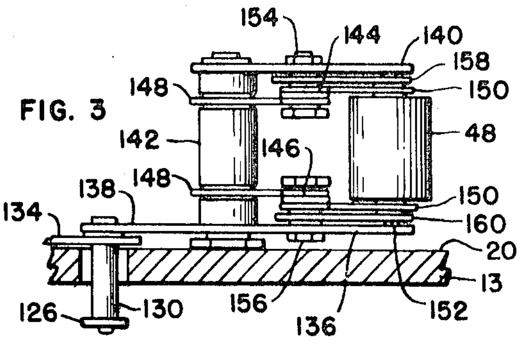
FIG. 3 is a sectional view according to line 3—3 on FIG. 1.

Means for rocking pinch roller 48 between a first position (FIG. 1) and a second position (FIG. 2) comprises a horizontal linkage 136 (FIG. 3) fashioned as an arm having an inner end portion 138 pivotally secured to follower 130 whereby the pinch roller is cam controlled (FIGS. 1, 2 and 3). To effect such control, the pinch roller is rotatably mounted at the outer end portions of linkage 136 and an arm 140 disposed parallel thereto. A vertical pivot 142 projects upwardly from base 13 through a medial portion of linkage 136 and is constrained to rock responsively to angular movement thereof. The inner end portion of arm 140 is rigidly secured to pivot 142 and accordingly will move angularly with linkage 136 in response to angular movement of cam 134.

Means for floatingly connecting the pinch roller to its holder comprised of linkage 136 and arm 140 include upper and lower coiled compression or torsion springs 144 and 146 loosely mounted about a pair of aligned vertically spaced vertical axis pins 154 and 156. Each of springs 144 and 146 has an inner horizontal extension 148 which is tensioned against the forward surface of pivot 142. Each spring also has an outer horizontal extension 150 which is tensioned against the forward surface of an associated of upper and lower ends of axis pin 152 for roller 48. The parts are arranged and proportioned such that a bias is imposed by springs 144 and 146 on the pinch roller in a counterclockwise direction about an axis defined by pins 154 and 156 when viewed from FIGS. 1 and 2.

Axis pins 144 and 156 are secured in arm 140 and linkage 136 and define a center of rotation for upper and lower arms 158 and 160. The latter are disposed medially of arm 140 and linkage 136 with their inner ends pivotably secured on said axis pins. Axis pin 148 is journaled in the outer ends of arms 158 and 160. As a result of the foregoing, rearwardly pinch roller 48 is floatingly arranged within the limits of a pair of slots 162, only one of which is shown (FIGS. 1 and 2) in the outer ends of linkage 136 and arm 140.

MODE OF OPERATION

In order to move the guide members to their second position (FIG. 2) from their first position (FIG. 1) cam 134 manually will be rocked clockwise in consequence of which follower 130 will be driven in cam slot 132 from its forward follower restraining end portion 164 (FIG. 2) toward its rear follower restraining end portion 166. Responsively, link 126 will shift rearwardly to its second position (FIGS. 2 and 8) from its first position (FIGS. 1 and 7) in which the follower is engaged in slot end portion 164.

Figure 7:
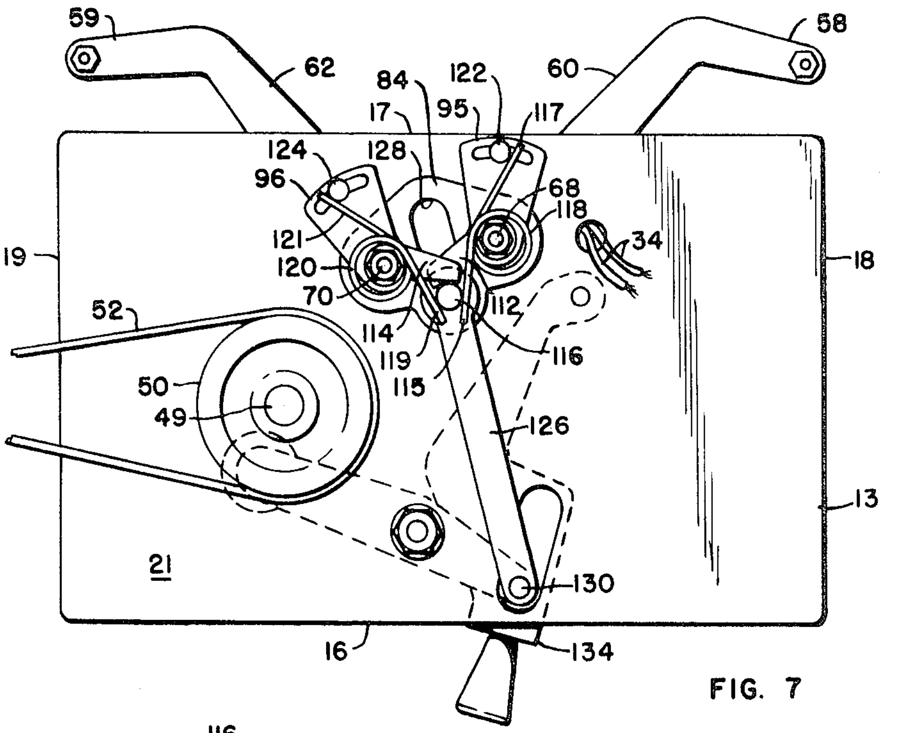
FIG. 7 is a bottom plan of the apparatus conditioned according to FIG. 1, the deck and web having been omitted.
Figure 8:
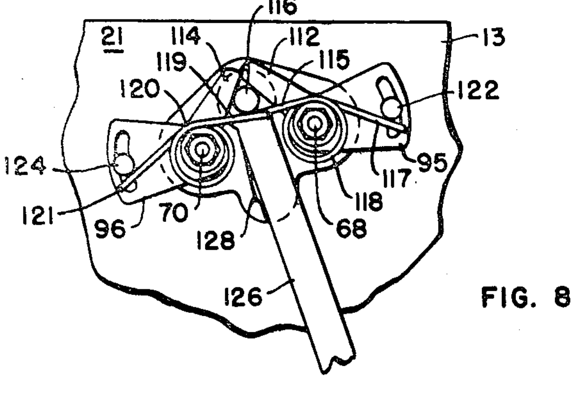
FIG. 8 is a view of a cam-operated link similar to FIG. 7 but conditioned as in FIG. 2.

Such movement forces boss 116 rearwardly with attendant rocking arms 60 and 62 clockwise and counterclockwise when viewed from FIG. 7. The movement of the arms is augmented by springs 118 and 120 which will be caused to rotate and close a gate comprised of extensions 115 and 119 in front of boss 116.

From such first position, guide members are floatable forwardly and back adjusting responsively to variation in the tension of tape 32, because the angular directions in which springs 118 and 120 are coiled enable rocking of brackets 95 and 96 and accordingly arms 60 and 62 independently of link 126. On the other hand, springs 118 and 120 are fashioned such that they prohibit backward float of arms 60 and 62 when the link is in its second position. Accordingly then, guide members 54 and 56 are substantially immobilized; follower 130 then being restrained by end portion 164 of the cam slot.

As many modifications in the described construction could be conceived, and as many changes could be made therein without departing from the spirit and scope of the claims, it is intended that all matter contained in the accompanying specification shall be considered as illustrative only and not in a limiting sense.

I claim:

1. In apparatus for managing a web supported for movement past an intelligence transfer station over a tortuous course defined by a pair of guide members, and wherein means for straightening the course between web supply and take-up members include a pair of arms arranged for moving said guide members, the improvement comprising:

cam-operated means for moving the arms between a first condition in which said guide members are arranged for providing a tortuous course for the web and a second condition in which the course for the web is straightened.

2. A combination according to claim 1 characterized by a cam, and wherein said means comprises a cam follower having first and second portions associated with said cam and said arms, respectively.

3. A combination according to claim 2 wherein said cam is movably mounted and has a cam track, and said follower comprises a member engaged in said track and a link associated with said arms for moving said guide members in response to movement of said cam.

4. A combination according to claim 3 characterized by a deck having a first surface over which said course extends and an opposed surface, said cam being arranged for rocking adjacent said first surface, said follower comprising a pin extending through said deck with one end portion engaged in said cam track and an opposite end portion connected to said link.

5. A combination according to claim 4 wherein said link comprises a straight member disposed adjacent said opposed surface and having one end section connected to said pin and an opposite end section for moving said member in response to movement of said lever.

6. A combination according to claim 5 wherein said cam track has opposed offset end portions for restraining movement of said follower, said straight member is mounted for movement between first and second aspects in which said follower moves in said cam track between said offset end portions, and characterized by spring means for releasably holding said arms in their first condition.

7. Apparatus according to claim 1 characterized by a cam connected to said cam operated means and arranged for movement between first and second aspects as said arms are moved between said first and second conditions.

8. Apparatus according to claim 7 characterized by:

means for moving said web and including a capstan and an opposable pinch roller; and means for rocking said pinch roller between a first position adjacent said capstan for moving the web in said course when tortuous and a second position removed from said capstan when said course is straightened.

9. Apparatus according to claim 8 wherein said rocking means comprises a linkage having opposite end portions connected to said cam and said pinch roller.

10. Apparatus according to claim 9 characterized by means for floatingly supporting said pinch roller from said linkage.

12. In apparatus for managing a web over a tortuous course defined by a pair of guide members disposed in opposed positions relative an intelligence transfer station and wherein means for straightening the course includes a pair of arms arranged for moving said guide members from a first condition in which the course is tortuous to a second condition in which the course is straightened, a combination comprising:

means for yieldably holding said arms in said first condition;

means for immobilizing said arms in said second condition;

a boss arranged for shifting; and a pair of projections connected from said arms and arranged for angular movement responsively to shifting of said boss for moving said arms between said first and second conditions.

12. A combination according to claim 11 wherein said holding means comprises a pair of springs associated with said arms and arranged for angular movement in operative association with said boss.

13. A combination according to claim 12 wherein said springs are coiled and each has a first extension arranged for yieldable urging said boss toward said projections.

14. A combination according to claim 13 wherein each spring is associated with one of said projections and has a second extension opposed to said first, each first extension arranged for biasing said boss in one direction against a corresponding projection, and each second extension arranged for urging said projection to bias said boss in an opposite direction.

15. A combination according to claim 12 characterized by:

a deck, said arms arranged for angular movement on one side of said deck; and a bracket disposed on the other side of said deck and secured for movement with each of said arms, one of said projections carried from each of said brackets in bearing association with said boss.

16. A combination according to claim 15 wherein each spring is coiled in association with one of said brackets and has a pair of extensions and characterized by a lug carried from each bracket, one of said extensions engaged with said lug for rotating said spring in one angular direction and urging movement of said shiftable means in one lineal direction, the other of said extensions engaging said boss for rotating said spring in an opposite angular direction and urging said shiftable means in an opposite lineal direction.

17. In web-managing apparatus having a first condition in which a tortuous web path is provided and a second condition in which the path is straightened, and wherein the path defining means comprises a pair of adjustable web guides mounted on one side of a deck on arms rockable between first and second positions for effecting said first and second conditions, a combination comprising:

a link mounted for shifting on the other side of said deck between first and second positions corresponding to said first and second conditions, and having opposed end portions;

a cam having a cam track with opposed restraining portions and mounted for rocking relative said deck between first and second angular aspects corresponding to said first and second conditions;
a cam follower secured from one end portion of said link and engaged in said cam track;
a boss secured from the other end portion of said link; and
means secured from said arms and responsive to said boss for moving said guides for effecting said first and second conditions.

18. A combination according to claim 17 characterized by:
a pair of pivots defining rocking axes associated with said arms;
a pair of oppositely coiled springs disposed about said axes,
each of said springs having first and second extensions, said first extensions biasing said arms in opposite angular directions to effect one of said conditions, said second extensions bearing against said boss and biasing said arms in opposite angular directions to effect the other of said conditions.

19. A combination according to claim 18 wherein said moving means comprises:
first and second brackets secured from said arms, respectively, and disposed on opposite sides of said boss for angular movement about said axes;
a projection from each bracket disposed in rockable bearing association with said boss, said brackets and springs arranged for enabling movement of said arms from said first position toward said second position independently of said boss, said second extensions arranged for resisting movement of said arms when in said second position for effecting said first condition.

20. A combination according to claim 19 wherein said track is proportioned such that the arms are releasably held from movement when said follower is engaged in said restraining portions, the first extensions projecting toward said boss from opposite direction such that, while said follower is restrained, the guides are rockable when the first condition prevails and the guides are immobilized if the second condition prevails.

* * * * *

PO-1050
(5/69)

UNITED STATES PATENT OFFICE
CERTIFICATE OF CORRECTION

Patent No. 3,623,644 Dated January 28, 1972

Inventor(s) ALF J. OLSEN

It is certified that error appears in the above-identified patent and that said Letters Patent are hereby corrected as shown below:

In column 6, line 17, "12" is changed to --11--.

Signed and sealed this 24th day of April 1973.

(SEAL)
Attest:

EDWARD M. FLETCHER, JR.
Attesting Officer

ROBERT GOTTSCHALK
Commissioner of Patents